July 24, 1962 C. H. SMITH, JR 3,045,625
AUTOMATIC FREQUENCY SEARCH AND FOLLOWING RECEIVER
Filed March 31, 1954
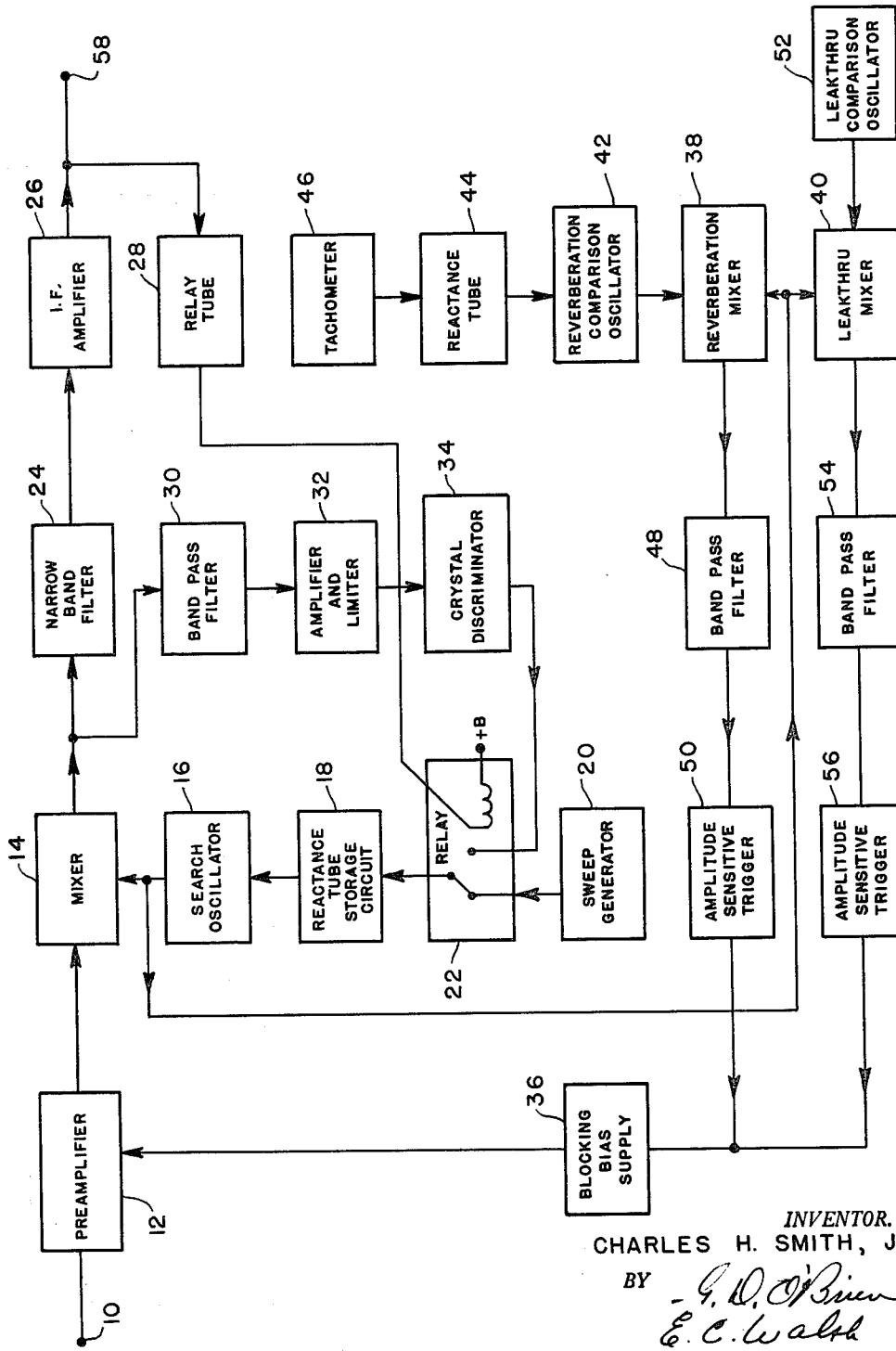
INVENTOR.
CHARLES H. SMITH, JR.
BY
ATTORNEYS

3,045,625
AUTOMATIC FREQUENCY SEARCH AND FOLLOWING RECEIVER

Charles H. Smith, Jr., McKeesport, Pa., assignor, by mesne assignments, to the United States of America as represented by the Secretary of the Navy
Filed Mar. 31, 1954, Ser. No. 420,215
11 Claims. (Cl. 114—23)

This invention relates to narrow band receivers and particularly to a narrow band receiver which can search and follow a signal of variable carrier frequency.

The receiver forming this invention is a modification of the receiver disclosed in U.S. patent application No. 414,527, filed March 5, 1954, entitled Automatic Frequency Search and Following Receiver by Joseph T. Laing and Arthur Nelkin. The receiver constituting this invention is suitable for use as a component of a continuous wave acoustic guidance system for torpedoes such as is disclosed in U.S. patent application No. 414,525, filed March 5, 1954, entitled Continuous Wave Acoustic Guidance System by William H. Hamilton and Arthur Nelkin. In the above identified continuous wave acoustic guidance system, acoustic energy at a substantially constant frequency and amplitude is continuously transmitted. The system produces an amplitude modulated signal having three components of different carrier frequencies. One of the components is the target signal and is due to transmitted acoustic energy reflected from a target. A second component is called reverberation and is due to reflection of the transmitted acoustic energy from immobile discontinuities in the sea. The third component is called leakthru and is due to the transmitted acoustic energy which is picked up directly from the transmitter. The leakthru has the same frequency as the transmitted acoustic energy. The frequency of the reverberation is equal to the frequency of the transmitted acoustic energy plus the change in frequency due to the Doppler shift resulting from the speed of the torpedo in which the system is mounted. The frequency of the target signal is equal to the frequency of the transmitted acoustic energy plus the Doppler shift resulting from the relative speed of the target with respect to the torpedo.

In the above identified continuous wave acoustic guidance system a four quadrant magnetostrictive transducer produces four voltages. Each voltage contains the target signal component, if a target is present, the leakthru component, and the reverberation component. The relative phase angles of the components of the voltages produced by the transducer depend on the relative bearing and elevation of the sources of the components. The output voltages of the receiving transducer are applied to a phase to amplitude converter. The four output voltages of the converter are commutated by a lobe commutator twice per second to produce a two cycle per second amplitude modulated output voltage. The output voltage of the commutator is applied to a transmitter leakthru rejection filter and a reverberation rejection filter so that only the ampltiude modulated target signal is applied to an automatic search and following receiver. The phase of the modulation envelope of the target signal provides the steering information which is used in guiding the torpedo to the target.

The receiver constituting this invention is adapted to have the output of the lobe commutator of the continuous wave acoustic guidance system applied directly to it so that the fragile, bulky, and expensive crystal rejection filters previously used can be eliminated. The input signal of the receiver, therefore, contains the target signal, reverberation and leakthru. The receiver contains rejection circuits which prevent the receiver from locking on the reverberation and leakthru but do not prevent it from locking on and following the target signal and producing an output signal of substantially constant frequency whose modulation envelope is in phase with the modulation envelope of the target signal.

The frequency of the reverberation is determined by the speed of the torpedo in which the invention is mounted as pointed out above. When a crystal reverberation rejection filter is used, it is necessary that the torpedo operate at a substantially constant speed since no provision can be conveniently made to shift the band of the rejected frequencies corresponding to reverberation to compensate for speed changes of the torpedo. Under certain tactical conditions it may be desirable for the torpedo to change speed during the course of its run. The reverberation which occurs at the second speed may be rejected by an additional reverberation rejection filter which is used when the torpedo is operated at the second speed. However, the increased cost and particularly the increased volume which the additional filter requires makes this solution undesirable. If the speed of the torpedo changes due to the excessive and unforeseen variations in the power developed by the torpedo during a run, there is no convenient way of shifting the band of rejected frequencies to correspond to the frequency of the reverberation at the new speed of the torpedo. The receiver constituting this invention, however, incorporates means for measuring the speed of the torpedo so that the frequency of the reverberation, which is a function of the speed is continuously known. This information then can be used to prevent the receiver from "locking on" the reverberation.

It is therefore an object of this invention to provide an automatic frequency search and following receiver to which may be applied an amplitude modulated signal having a plurality of components of different carrier frequencies, the carrier frequency of one of the components being undetermined and the remaining being determined, which is adapted to search for, find, and lock on the component, when present, whose carrier frequency is undetermined, and to produce an output voltage of a substantially constant carrier frequency whose modulation envelope is in phase with the modulation envelope of the component of the input signal whose carrier frequency is undetermined.

It is a further object of this invention to provide an automatic frequency search and following receiver for continuous wave acoustic guidance system to which the target signal, reverberation, and leakthru are applied and which will not lock on the reverberation and leakthru but will lock on and follow the target signal when present.

It is a further object of this invention to provide an automatic frequency search and following receiver for a continuous wave acoustic guidance system to which the target signal, reverberation and leakthru are applied and which does not lock on the reverberation or leakthru even though the frequency of the reverberation changes due to variations in the speed of the torpedo.

Other objects and many of the attendant advantages of this invention will be readily appreciated as the same become better understood by reference to the following detailed description when considered in connection with the accompanying block diagram.

Terminal 10 of the receiver is adapted to have applied to it an amplitude modulated input signal having three components such as is obtained from the lobe commutator of a continuous wave acoustic guidance system in a preferred example. The band width of the spectrum in which the carrier frequencies of the components can lie is determined by the frequency of the transmitted acoustic energy and the magnitude of the Doppler shift of the target signal component which is determined by the maximum speed of the torpedo and the maximum speed of the target. In a preferred example, this band width is 3 kc. wide, with the lower frequency limit being 60 kc.

The carrier frequency of the leakthru component is known and the carrier frequency of the reverberation component can be determined if the speed of the torpedo is known. The carrier frequency of the target signal component which is present in the input signal only when a target is present is determined by the relative speed of the torpedo with respect to the target and varies with change in speed and course of the target and the torpedo.

The input signal is applied to preamplifier 12 and the output of preamplifier 12 is applied to mixer 14. The input signal is heterodyned in mixer 14 with the output signal of search oscillator 16 to produce an output signal of mixer 14, the frequencies of whose components are equal to the difference in frequency between the frequency of the search oscillator 16 and the carrier frequencies of the components of the input signal. The frequency of search oscillator 16 is controlled by a conventional reactance tube and storage circuit 18. The search function of the receiver is accomplished by varying the frequency of search oscillator 16 over a predetermined band of frequencies, in a preferred example, from 72 to 75 kc., by means of the output voltage of sweep generator 20 which is applied to reactance tube 18 through relay 22. The output of mixer 14 is applied to a narrow band channel for noise reduction and lock control and to a broader band channel for automatic frequency control. The narrow band channel consists of filter 24, I.F. amplifier 26, and relay tube 28. The automatic frequency control channel consists of band pass filter 30, I.F. amplifier and limiter 32, crystal discriminator 34, reactance tube and storage circuit 18, and search oscillator 16. The output of discriminator 34 is applied to reactance tube 18 when relay tube 28 opens the circuit through the coil of relay 22. Narrow band filter 24 is a crystal filter having a band width of 10 cycles per second at the 3 db downpoints. The center frequency of the filter is the intermediate frequency, i.e., 12 kc. in a preferred example. Filter 30 in the automatic frequency control channel is a L.C. band pass filter which has a pass band, in a preferred example, of 40 cycles per second. Discriminator 34 has incorporated therein a crystal to keep the center frequency of the discriminator aligned with the center of filter 24.

To prevent the receiver from "locking on" the reverberation and leakthru components of the input signal, preamplifier 12 is biased to cut off by blocking bias supply 36 when the difference between the instantaneous frequency of oscillator 16 and the frequency of the reverberation or of the leakthru lies in the pass band of filter 24. To do this the output of search oscillator 16 is applied to reverberation mixer 38 and leakthru mixer 40. In mixer 38 the output of search oscillator 16 is heterodyned with the output of reverberation comparison oscillator 42. The frequency of oscillator 42 is controlled by reactance tube 44 which in turn is controlled by a suitable device for measuring the speed of the torpedo in which the receiver is mounted. Such a suitable device can be tachometer 46 which is driven by the main motor shaft of the torpedo. Tachometer 46 and reactance tube 44 control the frequency of oscillator 42 so that for any torpedo speed the frequency of oscillator 42 will equal the frequency of search oscillator 16 when the difference in frequency between the reverberation and search oscillator 16 lies in the center of the pass band of filter 24. The output of mixer 38 is passed through broad band pass filter 48. The upper cut off frequency of filter 48 is adjusted so that the output of both the search oscillator 16 and reverberation oscillator 42 are eliminated and only the difference frequency is passed. The filter cut off need not be sharp since the wanted and unwanted frequencies are widely separated. The low frequency cut off of the filter is adjusted to give a gradual reduction in output as the difference frequency approaches zero.

As the frequency of search oscillator 16 approaches the frequency at which reverberation would be passed by filter 24, the difference, or beat frequency, between search oscillator 16 and reverberation oscillator decreases. The output of filter 48 decreases in amplitude because of the cut off characteristics of the filter. This output is applied to trigger circuit 50 which is sensitive to amplitude changes only. When the amplitude of the output of filter 48 drops to a predetermined level, trigger circuit 50 causes blocking bias supply 36 to apply a blocking bias to preamplifier 12, cutting it off. The receiver is thus cut off until the search oscillator 16 has swept through the frequency range of the reverberation. When the frequency of search oscillator has changed so that the difference in frequency between its output and the frequency of the reverberation will not be passed by filter 24 the amplitude of the output of filter 48 increases past the predetermined level so that the blocking bias supply is no longer applied to preamplifier 12. The reverberation rejection circuit acts in the same manner while the search oscillator 16 is sweeping up or down in frequency. Preamplifier 12 is blocked each time oscillator 16 sweeps through the frequency range in which the reverberation component of the input signal might pass through filter 24, and there is no danger of the receiver locking on reverberation, or of steering information being derived from the reverberation.

The output of search oscillator 16 is likewise applied to leakthru mixer 40 where it is heterodyned with the output of leakthru comparison oscillator 52. The frequency of oscillator 52 is adjusted to equal the frequency of search oscillator 16 when the difference between the frequency of search oscillator 16 and the frequency of the leakthru lies within the pass band of filter 24. Since the leakthru component has the same frequency as the transmitted acoustic energy and is substantially constant, the frequency of leakthru comparison oscillator 52 is constant. The output of leakthru mixer 40 is passed through band pass filter 54 which is substantially the same as filter 48 to amplitude sensitive trigger 56 which is substantially the same as trigger 50. The operation of the leakthru rejection circuit is similar to the operation of the reverberation rejection circuit in that preamplifier 12 is biased to cut off each time the frequency of oscillator 16 is such that the difference between the frequency of oscillator 16 and the frequency of the leakthru is such as to lie in the pass band of filter 24.

In operation sweep generator 20 by means of reactance tube and storage circuit 18 sweeps search oscillator 16 through a specified range of frequencies. When the frequency of the oscillator 16 is such that the difference between the frequency of oscillator 16 and the frequency of the reverberation, or between the frequency of oscillator 16 and the frequency of the leakthru would be within the pass band of filter 24, the reverberation rejection circuit, or the leakthru rejection circuit, cut off preamplifier 12 and no signal is produced by mixer 14 which can pass through filter 24. When a target signal is present which differs in frequency from the frequency of the reverberation by a predetermined amount, the difference between the frequency of oscillator 16 and the target signal at some time during the sweep will be within the pass band of filter 24. When this occurs the signal will pass through filter 24, will be amplified by I.F. amplifier 26 and will be applied to relay tube 28 and output terminal 58. The output of amplifier 26 biases relay tube 28 to cut off which deenergizes relay 22 and connects the output of discriminator 32 to reactance tube 18. Discriminator 34 then controls the frequency of search oscillator 16 so that the difference between the frequency of the target signal and the frequency of oscillator 16 is centered at center frequency of filter 24 even though the carrier frequency of the target signal may vary due to variations in the closing rate of the torpedo with respect to the target. The output signal of the receiver has a substantially constant carrier frequency. The modulation envelope of the output signal is in phase with the modulation envelope of the target signal component of the input signal.

It is, of course, obvious that the blocking bias may be applied to any stage or stages in the receiver ahead of narrow band filter 24.

Obviously many modifications and variations of the present invention are possible in the light of the above teachings. It is therefore to be understood that within the scope of the appended claims the invention may be practiced otherwise than as specifically described.

What is claimed is:

1. An automatic frequency search and following receiver adapted to have applied thereto an amplitude modulated input signal having a plurality of components, the carrier frequencies of the components being different, the carrier frequency of one of said components being undetermined and variable, and the carrier frequencies of the remaining components being determined, comprising: a preamplifier to which the input signal is adapted to be applied; a mixer to which the output of said preamplifier is applied; a search oscillator, the output of said search oscillator being applied to said mixer; a first narrow band channel; a second broader band automatic frequency control channel; the output of said mixer being applied to said channels; means for periodically varying the frequency of the search oscillator over a predetermined band of frequencies; and circuit means for cutting off the preamplifier when the difference between the frequency of the search oscillator and the carrier frequencies of any of the components of said input signal whose carrier frequencies are determined is such as to lie within the pass band of the narrow band channel; said narrow band channel means comprising means for producing an output signal of substantially constant carrier frequency and means for disconnecting said means for periodically varying the frequency of the search oscillator from said search oscillator and for connecting the output of the broader band automatic frequency control channel to the search oscillator when the difference between the frequency of the search oscillator and the frequency of the component of the input signal whose frequency is undetermined is such as to be within the pass band of the narrow band channel; said second channel comprising means for controlling the frequency of the search oscillator to keep the frequency of the output of said mixer centered within the pass band of said narrow band channel.

2. A receiver as defined in claim 1 in which the circuit means for cutting off the preamplifier comprises: a second mixer to which is applied the output of the search oscillator, a comparison oscillator whose output is applied to said second mixer, a band pass filter, an amplitude sensitive trigger circuit and a blocking bias supply, the output of said mixer being connected to said trigger circuit through said filter, said trigger circuit being connected to said blocking bias supply, and the output of said blocking bias supply being applied to said preamplifier.

3. An automatic frequency search and following receiver adapted to have applied thereto an amplitude modulated input signal having a plurality of components of different carrier frequencies, the carrier frequency of one component being undetermined and the carrier frequencies of the remaining components being determinable, comprising: a preamplifier to which the input signal is applied; a mixer to which the output of said preamplifier is applied; a search oscillator whose output is applied to said mixer; means for periodically varying the frequency of the search oscillator over a predetermined band of frequencies; means for biasing to cut off the preamplifier when the difference between the frequency of the search oscillator and any one of the carrier frequencies of the components of the input signal whose frequencies are determinable has a predetermined value; a narrow band channel and a broader band automatic frequency control channel; the output of said mixer being applied to said channels; the center frequencies of said channels being at said predetermined value; said narrow band channel comprising means for producing an output signal when the frequency of the output of the mixer is at said predetermined value; and means for disconnecting the output of the means for periodically varying the frequency of the search oscillator and for connecting the output of the said automatic frequency control channel to said search oscillator when said narrow band channel produces an output voltage; said automatic frequency control channel comprising means for controlling the frequency of the search oscillator so that the frequency of the output of said mixer will be at said predetermined value.

4. An automatic frequency search and following receiver adapted to have applied thereto an input signal having a plurality of components having modulation envelopes and having different carrier frequencies, the carrier frequencies of all but one of said components being determinable, comprising: a preamplifier to which said input signal is adapted to be applied; a mixer to which the output of said preamplifier is applied; a search oscillator, the output of said search oscillator being applied to said mixer; a first narrow band channel; a second broader band channel, the output of said mixer being applied to said channels; said first channel comprising means for producing an output signal of substantially constant carrier frequency having a modulation envelope in phase with the modulation envelope of the component of the input signal whose carrier frequency is not determinable; said second channel comprising means for regulating the frequency of the search oscillator to keep the frequency of the output of said mixer in the center of the narrow band width of said first channel; means for periodically varying the frequency of said local oscillator over a predetermined band of frequencies; means controlled by said first channel for disconnecting said means for periodically varying the frequency of said oscillator and for connecting said second channel to said search oscillator when the frequency of the output of said mixer is such as to pass through said first channel; and means for applying a blocking bias to said preamplifier so that the input signal will not be applied to the mixer when the difference between the frequency of said search oscillator and the frequencies of any of the components of said input signal which are determinable would pass through said narrow band channel.

5. An automatic frequency search and following receiver adapted to have applied thereto an amplitude modulated input signal having a plurality of components of different carrier frequencies, the carrier frequencies of all but one of said components being determinable, comprising: a preamplifier to which said input signal is adapted to be applied; a mixer to which the output of said preamplifier is applied; a search oscillator; a first channel comprising a narrow band filter; an I.F. amplifier, and a relay tube; a second channel comprising a second filter, a second I.F. amplifier, a discriminator, a relay, a reactance tube and storage circuit, and said search oscillator; search means comprising a sweep generator, said relay, said reactance tube and storage circuit, and said search oscillator; said first and second channels connected to have the output of said mixer applied thereto; said relay initially connecting the output of said sweep generator to the reactance tube to cause the search oscillator to sweep a predetermined band of frequencies; said relay tube adapted to cause said relay to connect the output of said discriminator to said reactance tube and storage circuit and to disconnect the sweep generator when the frequency of the output of said mixer lies within the pass band of said first filter; said discriminator controlling the frequency of the search oscillator to maintain the frequency of the output of said mixer centered in the pass band of said first filter; the output of said receiver being the output signal of said first I.F. amplifier; and means for applying a block bias to said preamplifier so that no signal will pass through said preamplifier when the difference between the frequency of said search oscillator and the frequencies of any one of the components of the input signal whose frequencies can be determined are such as would pass through said narrow band filter.

6. In a continuous wave acoustic guidance system for a torpedo having a lobing commutator which produces an amplitude modulated output voltage having a target signal component, a reverberation component and a leakthru component, the carrier frequencies of said component being different, an automatic frequency search and following receiver comprising: a preamplifier to which the output voltage of said commutator is applied; a search mixer to which the output voltage of the preamplifier is applied; a search oscillator whose output is applied to said mixer; means for periodically varying the frequency of the search oscillator over a predetermined band of frequencies; means for biasing to cut off the preamplifier when the difference between the frequency of the search oscillator and the frequency of the reverberation component has a predetermined value and when the difference in frequency between the frequency of the search oscillator and the frequency of the leakthru component has the same predetermined value; a narrow band channel; a broader band automatic frequency control channel; the output of the mixer being applied to said channels; the center frequencies of said channels having said predetermined value; said narrow band channel comprising means for producing an output signal when the frequency of output of the mixer is at said predetermined value and means for disconnecting the output of the means for periodically varying the frequency of the search oscillator and for connecting the output of said automatic frequency control channel to said search oscillator when said narrow band channel produces an output signal; said automatic frequency control channel comprising means for controlling the frequency of the search oscillator so that the frequency of the output of said mixer will be at said predetermined value.

7. In a system as defined in claim 6 in which the means for biasing to cut off the preamplifier comprises a second mixer to which is applied the output of the search oscillator, a comparison oscillator whose output is applied to said second mixer, a band pass filter, an amplitude trigger circuit, and a blocking bias supply, the output of said second mixer being connected to said trigger circuit through said filter, said trigger circuit being connected to said blocking bias supply, and the output of said blocking bias supply being connected to said preamplifier.

8. In a system as defined in claim 7 in which the frequency of the said comparison oscillator is substantially constant, its frequency being substantially equal to the frequency of the search oscillator when the difference between the frequency of the search oscillator and the frequency of the leakthru component has said predetermined value.

9. In a system as defined in claim 7 in which the frequency of the comparison oscillator is determined by the speed of the torpedo in which the system is adapted to be mounted so that the frequency of said comparison oscillator equals the frequency of the search oscillator when the difference between the frequency of the search oscillator and the frequency of the reverberation component has said predetermined value.

10. In a system as defined in claim 6 in which the means for biasing to cut off the preamplifier comprises a second and a third mixer to which is applied the output of the search oscillator, a reverberation comparison oscillator whose output is applied to said second mixer, means for varying the frequency of said reverberation comparison oscillator responsive to changes in speed of the torpedo in which the guidance system is adapted to be mounted, a first band pass filter, a first amplitude sensitive trigger circuit, and a blocking bias supply, the output of said mixer being connected to said first trigger circuit through said first filter, said trigger circuit being connected to said blocking bias supply and the output of said blocking bias supply being applied to said preamplifier, a leakthru comparison oscillator whose output is applied to said third mixer, a second band pass filter, and a second amplitude sensitive trigger circuit, the output of said third mixer being connected to said second trigger circuit through said second filter, said second trigger circuit being connected to said blocking bias supply.

11. In a continuous wave acoustic guidance system for a torpedo as defined in claim 10 in which the means for varying the frequencies of the reverberation oscillator comprises a tachometer and a reactance tube circuit.

References Cited in the file of this patent

UNITED STATES PATENTS

| | | |
|---|---|---|
| 2,268,587 | Guanella | Jan. 6, 1942 |
| 2,431,854 | Wood | Dec. 2, 1947 |
| 2,438,580 | Shuck | Mar. 30, 1948 |
| 2,504,118 | Evans | Apr. 18, 1950 |
| 2,614,249 | Eaton | Oct. 14, 1952 |
| 2,621,243 | Sunstein | Dec. 9, 1952 |